United States Patent [19]

Miller et al.

[11] Patent Number: 4,715,039

[45] Date of Patent: Dec. 22, 1987

[54] INTERNAL RESONATOR WATER COOLED ION LASER

[75] Inventors: Mike F. Miller; Kim M. Gunther, both of Mountain View, Calif.

[73] Assignee: Spectra-Physics, Inc., San Jose, Calif.

[21] Appl. No.: 754,497

[22] Filed: Jul. 12, 1985

[51] Int. Cl.⁴ ............................................. H01S 3/00
[52] U.S. Cl. ...................................... 372/37; 372/34; 372/35; 372/76
[58] Field of Search ..................... 372/37, 76, 34, 35, 372/33, 61, 55, 58, 59; 445/9, 10

[56] References Cited

U.S. PATENT DOCUMENTS

Re. 31,279  6/1983  Mefford et al. ........................ 372/34
4,232,276  11/1980  Iwata ..................................... 372/35

FOREIGN PATENT DOCUMENTS 0074191  6/1980  Japan ..................................... 372/35
0210685  12/1983  Japan ..................................... 372/35

Primary Examiner—James W. Davie
Assistant Examiner—Georgia Y. Epps
Attorney, Agent, or Firm—Paul Davis

[57] ABSTRACT

A single unitary structure for an ion laser in which the plasma tube with a surrounding electromagnet is integrated with the laser resonator tube. Cooling channels are formed by a pair of annular channels between the resonator tube, electromagnet and plasma tube. A helical, flow path in the annular channels provides uniform cooling around the resonator tube.

17 Claims, 1 Drawing Figure

INTERNAL RESONATOR WATER COOLED ION LASER

BACKGROUND OF THE INVENTION

The invention relates generally to ion laser structures and more particularly to ion laser structures which include an electromagnet and which are water cooled.

Ion lasers generally comprise a plasma tube and separate optical resonator. The plasma tube contains the gain medium, a plasma created by running a discharge between an anode and cathode mounted at opposite ends of the tube. The optical resonator is the structure which supports a pair of spaced aligned mirrors positioned around the gain medium to produce lasing action. The plasma tube and optical resonator are generally two separate structures, with the plasma tube contained within the resonator by complex mounting arrangements. It would be highly advantageous and desirable to simplify the resonator-plasma tube structure in an ion laser to reduce the number of parts, make the design more compact, increase serviceability and reliability, and reduce costs, and increase performance.

In operation, a CW ion laser generates a lot of heat, which must be removed, at least in certain applications where stability of laser output is critical. The heat can cause thermal expansion of the resonator structure which will affect the mirror alignment and thus the laser output. Changes in cavity length result in frequency detuning of the laser. Thus, it is highly advantageous and desirable to provide water cooling in an ion laser. Water cooling of the laser is frequently utilized.

By magnetically compressing the plasma in an ion laser tube, higher gain and higher efficiency are obtained. Most water cooled ion lasers include a solenoid electromagnet around the plasma tube. Since the electromagnet also generates heat, it can be water cooled. However, as previously described, the plasma tube and resonator are separate structures so the inclusion of a water cooled electromagnet makes the total structure even more complex. Thus, it is also highly advantageous and desirable to simplify the design of an ion laser with a water cooled electromagnet.

To be most effective, the water cooling of the laser resonator must be uniform. If uneven cooling between the top and bottom of the resonator is provided, e.g., if the flow channels are not uniform, then the temperature difference between the top and bottom of the resonator may be sufficient to bend the resonator significantly, misaligning the mirrors and changing the laser output, even preventing lasing. This problem can be reduced by providing a thermal short between the top and bottom of the resonator. Shields or thermally conducting elements mounted in the resonator have been utilized, but these add components and are not totally effective. However, it would be advantageous and desirable to provide a top to bottom thermal short in the resonator.

Accordingly, it is an object of the invention to provide an improved design for a plasma tube—optical resonator configuration in an ion laser.

It is also an object of the inventor to provide a simplified structure for an ion laser.

It is another object of the invention to provide an ion laser structure including an electromagnet for compressing the plasma in the laser tube.

It is a further object of the invention to provide a water cooled laser structure which more effectively cools the resonator, electromagnet and plasma tube.

It is yet another object of the invention to provide a top to bottom thermal short in an ion laser resonator.

It is another object to minimize environmental effects to an ion laser resonator.

SUMMARY OF THE INVENTION

The invention is a monolithic structure for an ion laser in which the plasma tube with a surrounding solenoid electromagnet is integrated with the laser resonator tube into a single unitary structure, with water cooling provided to the resonator tube, electromagnet, and plasma tube. The plasma tube surrounded by a solenoid electromagnet surrounded by a resonator tube are mounted concentrically in a spaced relationship so that an inner flow channel is defined between the plasma tube and the electromagnet and an outer flow channel is defined between the electromagnet and the resonator tube. With this integrated assembly, the complexity is minimized while the efficiency is maximized. Each element provides multiple functions. The plasma tube confines the plasma and forms one wall of the inner cooling channel. The resonator tube supports the optical elements which define the laser cavity and also forms one wall of the outer cooling channel. The magnet cover and bobbin which contain the electromagnet which is mounted between the plasma tube and resonator tube form the other walls of the outer and inner flow channels, respectively.

Coolant, typically water, is flowed through the channels to cool the resonator tube, electromagnet, and plasma tube. In a preferred configuration, the coolant is first flowed longitudinally along the outer flow channel to cool the resonator tube and outside of the electromagnet. The coolant is then flowed longitudinally back along the inner flow channel to remove heat from the inside of the electromagnet and the plasma tube. Thus, the coldest fluid is in contact with the resonator which is the most critical component with respect to thermal effects. The outer and inner flow channels typically are connected through a chamber at one end of the assembly and the fluid is flowed from the colder end of the laser (cathode) to the hotter end (anode) and back. Alternatively, the two flow channels need not be connected and two independent flows can be utilized.

In order to maximize the cooling effectiveness and provide a thermal short across the resonator, the most preferred flow pattern according to the invention is a helical flow. As the coolant flows longitudinally along the outer channel, the coolant also flows circumferentially around the electromagnet. Similarly the coolant also flows circumferentially around the plasma tube. Thus, the preferred flow pattern is helically around the circumference of the annular flow channel while the helix winds longitudinally along the channel from one end to the other. The helical flow channel is formed by flow diverter means, e.g., a coil of wire, placed in the annular channel. As the fluid flows in this helical path, circumferentially around the structure, the fluid continually passes from the top of the resonator to the bottom and back to the top so top to bottom thermal differences are eliminated. Thus, according to the invention, the coolant itself provides a thermal short in the resonator.

DETAILED DESCRIPTION OF THE PREFERRED EMBODIMENTS

Figure 1:
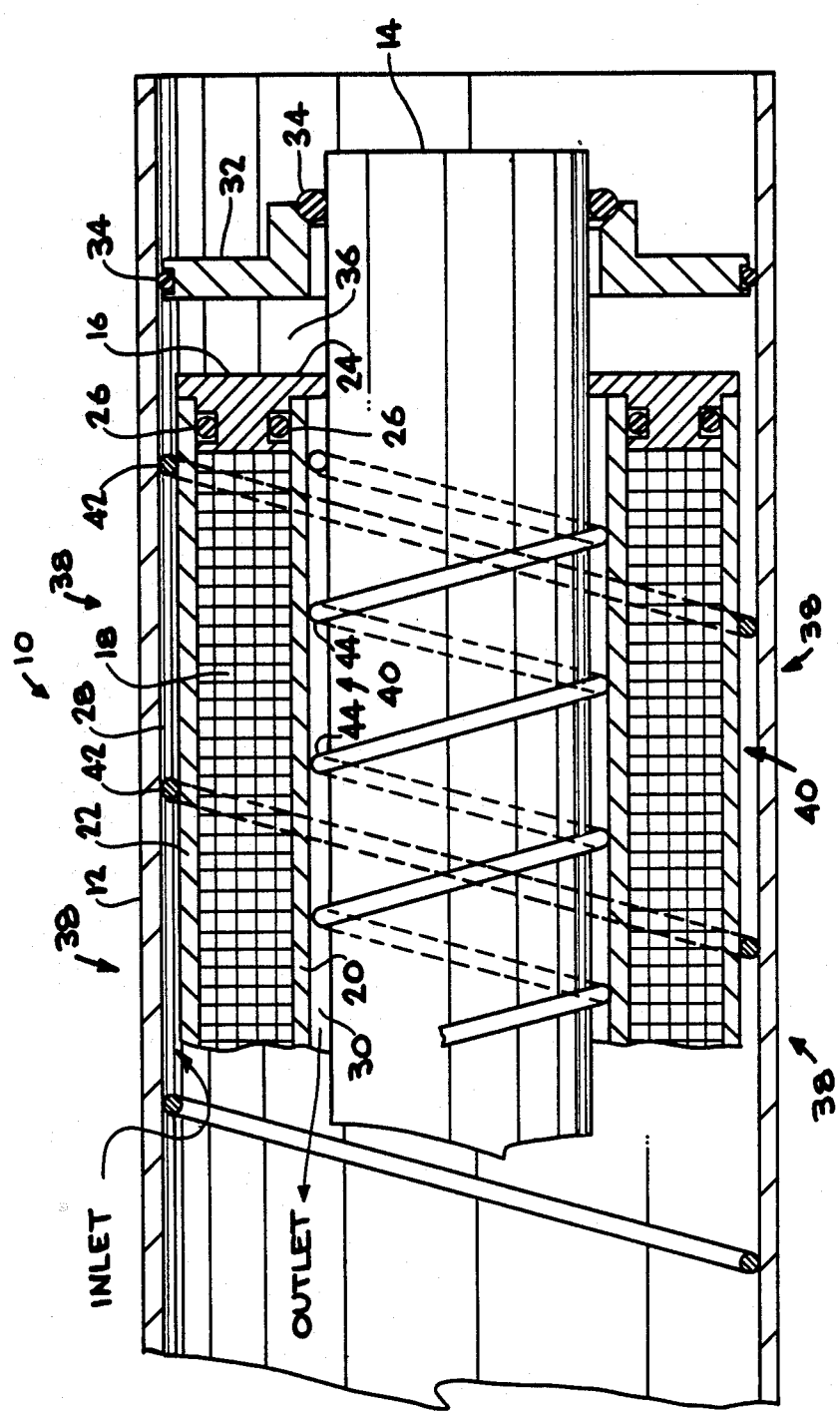
FIG. 1 is a cross sectional view of a water cooled integrated plasma tube-electromagnet-resonator structure for an ion laser.

As shown in FIG. 1, an integrated resonator tube-electromagnet-plasma tube assembly 10 comprises a resonator tube 12 and a plasma tube 14 mounted within the resonator 12 in a concentric spaced apart relationship. The plasma tube 14 and resonator 12 are typically cylindrical in shape. The plasma tube 14 is typically made of a ceramic, preferable alumina. In operation, tube 14 contains a gas, e.g., Argon, Xenon, and a plasma discharge is produced within plasma tube 14 by passing a discharge current through the tube 14 between an anode and cathode (not shown) which are positioned at the ends of the tube 14. The components necessary to provide the gas in tube 14 and produce the plasma are conventional and are not shown; suitable electrical components, seals flanges can be attached to the end of assembly 10. The resonator tube 12 provides the structure to support the necessary optical elements (not shown) to define a laser cavity around the plasma gain medium; the optical components, including mirrors and positioning and adjusting means, are conventional and are not shown, but are mounted to the ends of resonator tube 12.

A solenoid electromagnet 16 is formed of magnet windings 18 wound around a magnet bobbin or core 20 and enclosed by an outer magnet cover 22 with magnet flange 24 closing the ends; O-rings 26 may be used to form a seal between flange 24 and bobbin 20 and cover 22. Conventional electrical connections (not shown) are Provided to windings 18 to energize the electromagnet 16. The electromagnet 16 is thus typically cylindrical in shape and fits concentrically between plasma tube 14 and resonator tube 12. Electromagnet 16 is spaced apart from both resonator tube 12 and plasma tube 14 and forms therewith an outer annular channel 28 and an inner annular channel 30 respectively. Outer channel 28 runs substantially along the length of assembly 10 between electromagnet 16 and the inside wall of resonator tube 12; inner channel 30 similarly runs along assembly 10 between electromagnet 16 and the outside wall of plasma tube 14.

Plasma tube 14 and resonator tube 12 are held in a spaced concentric relationship by means of a resonator flange 32 at each end of assembly 10; O-rings 34 may provide a tight seal. Flange 32 also forms with resonator tube 12, plasma tube 14 and electromagnet 16 a chamber 36 which connects outer channel 28 and inner channel 30 at one end of assembly 10. At the other end, the chamber 36 could be divided in a conventional manner to provide a separate inlet and outlet, as represented schematically in FIG. 1. The flow path for coolant can be formed by interconnecting the channels 28, 30 in different ways. In a preferred embodiment, as shown in FIG. 1, the fluid is inlet at one end of outer channel 28, flows along channel 28 to the other end, where the fluid flows into the inner channel 30 and returns to the input end. The coolant is preferably first flowed along the outer channel 28 in order to cool the resonator tube 12, which is the most temperature sensitive component; the flowing coolant can then remove heat from plasma tube 14 on the return flow. Electromagnet 16 is cooled both on the outside and inside. However, alternative flow arrangements are possible. Channels 28, 30 need not be connected at all, providing two separate flow paths, each with its own inlet and outlet, or there could be a common inlet at one end and common outlet at the other to provide two parallel simultaneous flow paths.

Any fluid can be used as the coolant, either liquids or gases. A common liquid for use as the coolant is water. The flow rate can be varied as necessary to provide the required degree of cooling. The resonator tube 12 can be made of a variety of materials, depending on the application of the laser. If the application allows multi-line, multimode operation, e.g., a medical laser, then a high coefficient of thermal expansion material, e.g., brass, may be used since some change in the length of the optical cavity is not permissible. If the application requires single frequency operation, then a lower expansion material should be used.

In addition to the generally longitudinal flow of coolant as previously described, a particularly preferred flow pattern according to the invention to provide more even cooling is a helical flow circumferentially around the annular channel. A helical passageway 38 is formed in annular outer channel 28 and a similar helical passageway 40 is formed in annular inner channel 30. The helical passageway 38 is a continuous helical path winding around magnet cover 22 from one end to the other, and is formed by a flow diverter means 42 positioned in annular channel 28. The flow diverter means 42 forms a seal between magnet cover 22 and resonator tube 12 forcing coolant flow to spiral around annular channel 28 from one end to the other. Flow diverter 42 may be formed with a spiral wire. Similarly, helical passageway 40 is formed in annular channel 30 by flow diverter means 44, e.g., a spiral wound wire. With the helical flow configuration, coolant flow is thus both circumferential, around the circumference of the annular channel, as well as longitudinal, from end to end of the annular channel.

The helical passageways 38, 40 provide for more uniform cooling since the coolant continuously circulates from top to bottom and back to the top. Therefore, a temperature difference between top and bottom is prevented which eliminates the problem of distorting the resonator tube 12 and thereby misaligning the mirrors mounted thereto. Uniform cooling is thus provided around the entire resonator tube 12. Therefore, the coolant itself provides a thermal short across the entire resonator tube 12, relaxing the requirements on the thermal properties of the tube material and eliminating the need for additional components.

Accordingly, the invention provides an integral structure which incorporates the plasma tube and resonator tube in a single assembly enclosing an electromagnet for maximizing laser operating efficiency and forming therein flow channels for efficient cooling of the resonator tube, electromagnet and plasma tube. This structure is simple, with a minimum number of parts arranged compactly, so it is economical to build and less likely to fail. Separate and redundant systems are eliminated by using a single functional component in their place. Complex mounting structures are also eliminated. Effective cooling of the resonator prevents undesirable thermal expansion which can frequency detune the laser by changing the cavity length. Cooling rate can be varied according to the coolant utilized and the flow rate. The most efficient and uniform cooling is achieved by means of a helical flow pattern which provides a thermal short across the entire resonator, thus preventing bending of the resonator which can seriously affect lasing operation.

Changes and modifications in the specifically described embodiments can be carried out without departing from the scope of the invention which is intended to be limited only by the scope of the appended claims.

We claim:

1. An integrated resonator tube-magnet-laser tube apparatus for an ion laser, comprising:
    a resonator tube;
    a magnet concentrically mounted in a spaced relationship within the resonator tube and defining between the magnet and resonator an outer coolant flow channel;
    a plasma tube concentrically mounted in a spaced relationship within the magnet and defining between the magnet and plasma tube an inner coolant flow channel.

2. Apparatus of claim 1 further including a chamber formed in one end of said apparatus between the resonator tube, plasma tube and magnet, the chamber communicating with both the inner and outer channels to interconnect the channels to provide a continuous flow path between the channels.

3. Apparatus of claim 2 further including inlet means operatively connected to the outer channel and outlet means operatively connected to the inner channel, each at the opposite end from the chamber, for producing a flow path from the inlet means, along the outer channel, through the chamber, and back along the inner channel to the outlet means.

4. Apparatus of claim 1 further including flow diverter means mounted within the outer channel to provide a helical flow path around the circumference of the outer channel from one end to the other.

5. Apparatus of claim 4 further including flow diverter means mounted within the inner channel to provide a helical flow path around the circumference of the inner channel from one end to the other.

6. Apparatus of claim 5 wherein the flow diverter means is a spiral wire wound around the magnet and contacting the resonator tube.

7. Apparatus of claim 1 wherein the magnet is an electromagnet formed of a magnet winding on a bobbin and enclosed by an outer magnet cover with a flange sealing the end, the bobbin forming one wall of the inner channel, the cover forming one wall of the outer channel.

8. In an ion laser having an optical resonator supporting a pair of spaced aligned mirrors, defining an optical cavity, a plasma tube containing a gain medium positioned within the resonator, excitation means for exciting the gain medium to form a plasma to produce lasing action, and an electromagnet surrounding the plasma tube to magnetically compress the plasma, the improvement comprising:
    a resonator tube;
    a magnet concentrically mounted in a spaced relationship within the resonator tube and defining between the magnet and resonator tube an outer coolant flow channel;
    a plasma tube concentrically mounted in a spaced relationship with the magnet and defining between the magnet and plasma tube an inner coolant flow channel.

9. Apparatus of claim 8 further including a chamber formed in one end of said apparatus between the resonator tube, plasma tube and magnet, the chamber communicating with both the inner and outer channels to interconnect the channels to provide a continuous flow path between the channels.

10. Apparatus of claim 9 further including inlet means operatively connected to the outer channel and outlet means operatively connected to the inner channel, each at the opposite end from the chamber, for producing a flow path from the inlet means, along the outer channel, through the chamber, and back along the inner channel to the outlet means.

11. Apparatus of claim 8 further including flow diverter means mounted within the outer channel to provide a helical flow path around the circumference of the outer channel from one end to the other.

12. Apparatus of claim 11 further including flow diverter means mounted within the inner channel to provide a helical flow path around the circumference of the inner channel from one end to the other.

13. Apparatus of claim 11 wherein the flow diverter means is a spiral wire wound around the magnet and contacting the resonator tube.

14. Apparatus of claim 8 wherein the magnet is an electromagnet formed of a magnet winding on a bobbin and enclosed by an outer magnet cover with a flange sealing the end, the bobbin forming one wall of the inner channel, the cover forming one wall of the outer channel.

15. Method for forming an integrated resonator-plasma tube-electromagnet structure, comprising:
    mounting a plasma tube in a concentric spaced relationship within a resonator tube;
    mounting an electromagnet in a concentric spaced relationship between the plasma tube and resonator tube to form an outer channel between the electromagnet and resonantor tube and an inner channel between the plasma tube and the electromagnet and
    forming a helical passageway through the outer channel.

16. Method of claim 15 further including connecting the inner and outer channels together at one end of the integrated resonator-plasma tube-electromagnet structure and further including connecting an inlet means to the outer channel and connecting an outlet means to the inner channel, each at the opposite end of the structure from the end where the channels are connected, for flowing a coolant along the outer channel, to the inner channel, and back through the inner channel.

17. Method of claim 15 further including a flowing a coolant through the inner and outer channels.

* * * * *

UNITED STATES PATENT AND TRADEMARK OFFICE

Certificate

Patent No. 4,715,039                                                                  Patented: December 22, 1987

On petition requesting issuance of a cetificate for correction of inventorship pursuant to USC 256, it has been found that the above-identified patent, through error and without any deceptive intent, improperly sets forth the inventorship. Accordingly, it is hereby certified that the correct inventorship of this patent is:
Mike F. Miller, Kim M. Gunther and Steven M. Jarrett.

Signed and Sealed this Sixth Day of March, 1990.

WILLIAM L. SIKES

*Supervisory Patent Examiner*
*Group Art Unit 251*